Aug. 15, 1933.    J. G. G. FROST    1,922,429
PROCESS OF MELTING ALUMINUM
Original Filed May 15, 1931
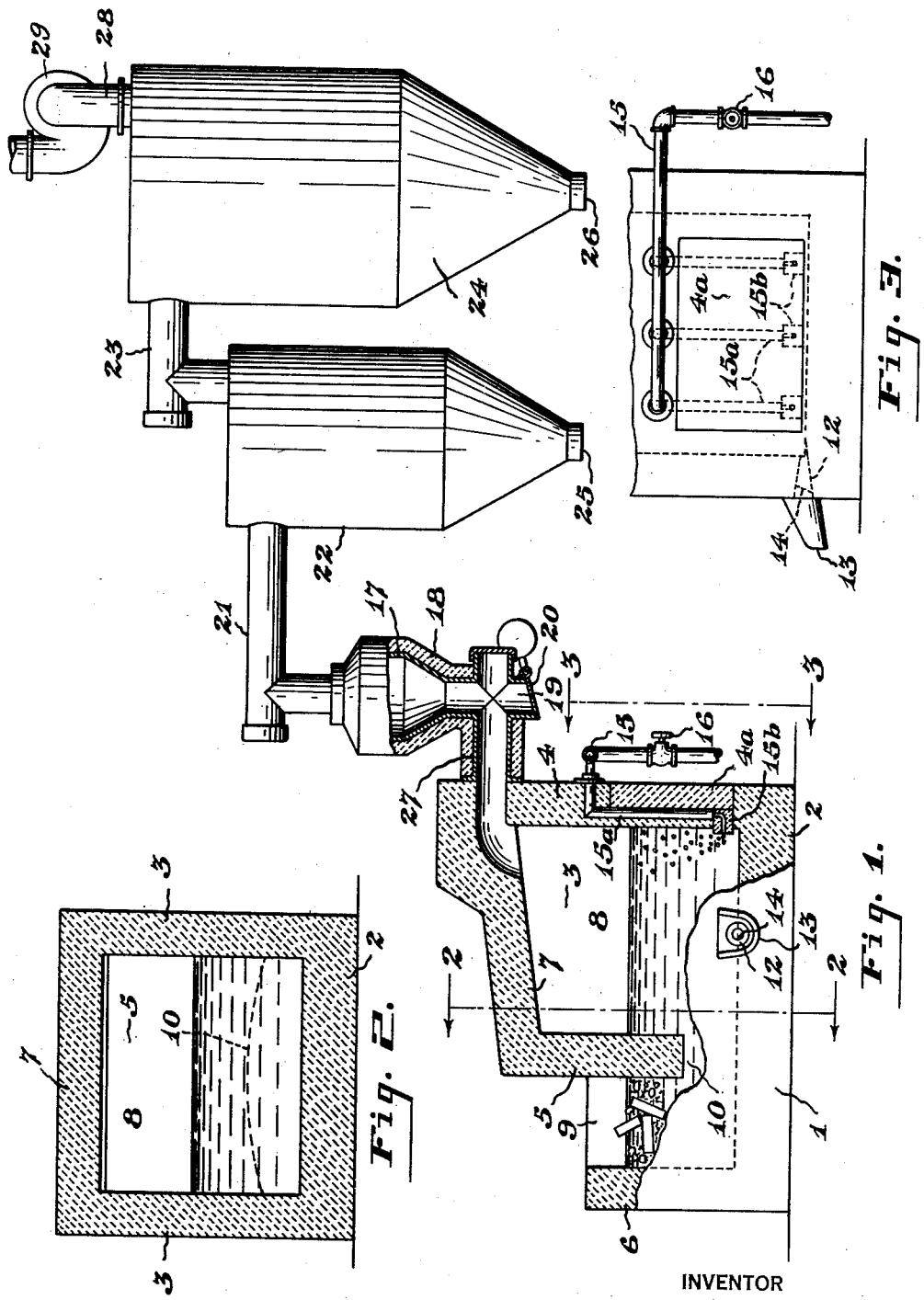
INVENTOR
John G. G. Frost
BY
Evans & McCoy
ATTORNEYS Patented Aug. 15, 1933

1,922,429

UNITED STATES PATENT OFFICE 1,922,429

PROCESS OF MELTING ALUMINUM

John G. G. Frost, Cleveland, Ohio, assignor to The National Smelting Company, Cleveland, Ohio, a Corporation of Ohio Application May 15, 1931, Serial No. 537,610
Renewed January 20, 1933

7 Claims. (Cl. 75—58)

This invention relates to a process of melting aluminum or alloys thereof by the utilization of heat from an exothermic reaction in which a portion of said aluminum takes part, and is an improvement in the invention disclosed and broadly claimed in my application for process of smelting aluminum, Serial No. 456,181, filed May 27, 1930.

An object of the invention is to provide an economical process of melting aluminum and alloys thereof. A further object is to provide a process of melting aluminum not requiring the external application of heat. Another object is to provide a process of melting aluminum whereby a fraction of the aluminum may be caused to react chemically to produce exothermic heat sufficient to melt the remainder of the aluminum.

Other objects of the invention will be apparent to those skilled in the art from the disclosures herein made.

Briefly, my invention contemplates the melting of aluminum by causing chlorine to react with a sufficient proportion, at least about five percent, of said aluminum to cause the generation of sufficient heat to melt the remainder of the aluminum, the heat being produced as a result of the exothermic nature of the reaction between aluminum and chlorine. The reaction preferably takes places in an enclosed heat-retaining chamber wherein the process may be carried on continuously, the chlorine being introduced into a bath of molten aluminum, the aluminum chloride formed from the reaction being withdrawn from the chamber for condensation and recovery, the heat from the reaction being utilized to maintain the aluminum molten and to melt additional aluminum, and additional solid aluminum being introduced into the molten bath. Since the reaction is carried on in an enclosed chamber sealed from the atmosphere, the molten metal therein is protected from oxidation. The molten aluminum may be withdrawn as desired from the chamber.

In the drawing, Figure 1 is a diagrammatic view partly in section of one form of apparatus wherein my invention may be carried out.

Fig. 2 is a vertical section taken on line 2—2 of Fig. 1;

Fig. 3 is a fragmentary and elevation taken on line 3—3 of Fig. 1.

In the drawing I have illustrated a furnace 1 having a base 2, side walls 3, rear wall 4, front walls 5 and 6, and top 7. The front wall 5 is cut away at its base to define the arched opening 10. The furnace 1 is constructed of firebrick or similar material which will withstand high temperatures and which will serve to retain heat within the furnace, the construction furthermore being relatively gas-tight to inhibit outward leakage of chlorine. The base 2, walls 3, 4 and 5, and top 7 define a reaction chamber 8 in which the reaction between the aluminum and chlorine take place. The front wall 6 is relatively low and with the extensions of the side walls and base defines a charging trough 9 which communicates with the chamber 8 through the opening 10 in the front chamber wall 5. A tap hole 12 and associated trough 13 may be provided for withdrawing molten metal from the furnace and a suitable closure 14, such as of clay, may be employed to seal the tap hole 12. A chlorine conduit 15 is shown as branching into a plurality of conductors 15$^a$ extending through the wall 4 and as arranged to introduce chlorine into the reaction chamber adjacent to the base thereof. The portions of the conductors 15$^a$ contacting with the interior of the reaction chamber are shown as constituted by the blocks 15$^b$ which may be of silica or other material which will withstand to a reasonable degree the action of the molten aluminum thereon. The wall portion 4$^a$ is shown as removable to permit repair and replacement of the blocks 15$^b$ and conductors 15$^a$. A suitable valve 16 is provided in connection with the conduit 15 to regulate the flow of chlorine into the reaction chamber and molten aluminum. A plurality of conductors 15$^a$ is preferably provided in order that the chlorine may be introduced more uniformly and effectively into the molten metal to be treated.

A sealable opening (not shown) may be provided in one or more of the walls 3, 4 and 5 to permit access to the interior of the reaction chamber 8 for cleaning or other purposes.

Suitable means is shown to condense the aluminum chloride, the primary product of the reaction between the chlorine and the aluminum metal. Thus, communicating with the interior of the furnace 1 is a condenser 17 which is shown as provided with an insulating cover 18. The condenser is shown as provided with a bottom opening at 19 which may be closed by the counter-balanced closure 20. The condenser 17 communicates at its top through the conduit 21 with a second condenser 2 which again communicates through conduit 23 with a third condenser 24. The condenser 24 is shown as communicating with the atmosphere through a conduit 28 and exhaust fan 29. The fan 29 or other equivalent means provides sufficient draft to maintain the reaction chamber 8 at slightly less than atmospheric pressure whereby leakage of chlorine outwardly of the furnace may be prevented. The condensers 22 and 24 are shown as provided with bottom openings 25 and 26, respectively, from which condensed material may be removed.

In carrying out my improved process, metallic aluminum or alloys thereof is introduced into the charging trough 9. Preferably at the commencement of the process the chamber 8 is preheated by suitable heating means (not shown). A "heal" of molten aluminum may be introduced into the furnace reaction chamber 8 in order that the reaction between aluminum and chlorine may start off at a rapid rate. When the process is under way, the level of the molten aluminum is maintained above the lower edge of the wall 5, whereby said wall 5 will seal the surface of the molten aluminum within the chamber 8 and the space above said molten metal from the outside atmosphere.

Chlorine is then introduced into the molten aluminum through the conductors 15ª, the amount of chlorine being preferably sufficient to react with at least about five percent of the aluminum present in order that sufficient heat may be produced, by reason of the reaction between the aluminum and chlorine, to continuously melt the aluminum charged into the furnace. As the result of the reaction between the aluminum and chlorine, aluminum chloride is formed which passes through the conduit 27 into the condenser 17 and progressively through the condensers 22 and 24. If materials such as tin, lead, iron, etc. are present in the aluminum, there may be a small proportion of the chlorides of such metals formed. The least volatile chlorides will be condensed in the condenser 17 and may be readily removed and the progressively more volatile chlorides will be condensed in the condenser 22, the purest aluminum chloride being obtained from the condenser 24. Any remaining uncondensed products will pass out of the condenser 24 into the atmosphere through the conduit 28, the draft produced by the fan 29 or equivalent means being sufficient to maintain the space in the reaction chamber above the molten metal at slightly less than atmospheric pressure, and sufficient to draw the gaseous reaction products through the condensing system.

The material charged into the charging trough 9 may be from virgin or secondary sources and may be in ingot form or in the form of castings, stampings, skimmings, borings, etc. By reason of the communicating opening 10 between the trough 9 and reaction chamber 8, the heat produced as a result of the exothermic reaction between aluminum and chlorine progressively melts the metal charged into the trough 9. Periodically, or continuously, as the case may be, molten aluminum may be removed from the chamber 8 through the tap hole 12.

The metal in the charging trough 9 may be agitated periodically or continuously in order to promote the transfer of heat to the colder metal and consequently the melting of the solid metal charged into the trough. It is desirable, furthermore, to dispose a suitable flux on the surface of the metal in the charging trough which is exposed to the atmosphere, in order to inhibit oxidation. Due to the exclusion of the outside atmosphere from the reaction chamber 8, it is not necessary to dispose a flux on the metal in the reaction chamber.

By the process herein described it will be seen that aluminum metal may be melted without the addition of heat other than that produced from the exothermic reaction between aluminum and chlorine, the heat from said reaction providing a temperature sufficiently high to melt the metal charged thereinto.

The proportion of chlorine to aluminum will be determined by the amount of chloride which it is desired to produce, the process permitting of the utilization of a wide range of proportions of chlorine to molten aluminum, and the products produced by the process.

It will thus be seen that I have provided a process whereby aluminum may be melted without requiring the use of external heating means.

It will further be noted that I have provided a process whereby the heat required to melt aluminum is provided by a chemical reaction, the product of the reaction being of commercial value.

It will be noted that my process is highly adapted to be operated in continuous manner with the attendant operational advantages, the aluminum to be melted being supplied continuously to the charging trough, the aluminum chloride being condensed and the aluminum being continuously melted and available for removal from the reaction chamber as desired.

The furnace structure disclosed in this application forms a part of my co-pending application Serial No. 538,144, filed May 18, 1931, in which the furnace is claimed.

Furthermore, it is to be understood that the particular forms of apparatus shown and described, and the particular procedure set forth, are presented for purposes of explanation and illustration, and that various modifications of said apparatus and procedure can be made without departing from my invention as defined in the appended claims.

What I claim is:

1. The process of melting aluminum which comprises introducing into a bath a molten aluminum or alloy thereof sufficient chlorine to react with about five percent of said aluminum, recovering the aluminum chloride formed from said reaction, conserving the exothermic heat from said reaction, introducing additional metallic aluminum into said molten bath, and utilizing said exothermic heat to melt said added aluminum.

2. The process of melting aluminum which comprises introducing chlorine into molten aluminum, introducing metallic aluminum into said molten bath, and utilizing the exothermic heat formed from the reaction between the aluminum and chlorine to melt said metallic aluminum.

3. The process of continuously melting aluminum which comprises continuously introducing chlorine into a bath of molten aluminum, said chlorine being insufficient in amount to react with the entire amount of aluminum present, conserving the exothermic heat produced from the reaction between the aluminum and chlorine, continuously introducing metallic aluminum into said molten bath, utilizing said exothermic heat to melt said added metallic aluminum, and recovering the aluminum chloride formed from the reaction.

4. The method of melting aluminum which comprises providing a molten bath of aluminum in a reaction chamber, passing sufficient chlorine into said molten aluminum to react with a portion of the aluminum and to produce by such reaction sufficient exothermic heat to melt additional aluminum, introducing additional solid aluminum into the molten bath, and continuing the passage of chlorine into the molten bath so that in its reaction with a portion of the aluminum sufficient additional exothermic heat will be produced to melt the addtional aluminum.

5. A continuous method of melting aluminum which comprises providing a molten bath of aluminum in a reaction chamber, passing sufficient chlorine into said molten aluminum to react with a portion of the aluminum and to produce by such reaction sufficient exothermic heat to melt additional aluminum, introducing additional solid aluminum into said molten bath, and continuing the passage of chlorine into the bath so that in its reaction with a portion of the aluminum sufficient exothermic heat will be produced to melt the additional solid aluminum as it is added.

6. The method of melting aluminum which comprises introducing chlorine into molten aluminum confined in a closed reaction chamber, introducing metallic aluminum into an open chamber communicating with said reaction chamber, and utilizing the exothermic heat formed from the reaction between the aluminum and chlorine to melt the metallic aluminum.

7. A continuous method of melting aluminum which comprises introducing molten aluminum into a reaction chamber which communicates with an open chamber, passing sufficient chlorine into the reaction chamber to react with a portion of the aluminum and to produce by such reaction sufficient exothermic heat to melt the remainder of the aluminum, introducing additional solid aluminum in the open chamber, continuing the passage of chlorine into the molten bath, and utilizing the exothermic heat formed by the reaction with aluminum to melt the additional aluminum which is added.

JOHN G. G. FROST.